(12) United States Patent
Lee et al.

(10) Patent No.: US 7,527,412 B2
(45) Date of Patent: May 5, 2009

(54) SURFACE EMITTING DEVICE AND DISPLAY APPARATUS INCLUDING THE SAME

(75) Inventors: Hong-seok Lee, Yongin-si (KR); Seung-ryong Park, Seongdong-gu (KR); Seok-ho Song, Seongdong-gu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 33 days.

(21) Appl. No.: 11/730,116

(22) Filed: Mar. 29, 2007

(65) Prior Publication Data

US 2008/0101092 A1    May 1, 2008

(30) Foreign Application Priority Data

Oct. 25, 2006    (KR)    ........................ 10-2006-0103888

(51) Int. Cl.
*G02B 5/32*    (2006.01)
(52) U.S. Cl. ..................... 362/617; 362/619; 359/15; 359/19
(58) Field of Classification Search ................. 362/613, 362/615, 617, 619; 359/15, 19, 22
See application file for complete search history.

(56) References Cited

U.S. PATENT DOCUMENTS

| | | | |
|---|---|---|---|
| 7,044,628 B2 * | 5/2006 | Choi et al. .................. 362/628 |
| 7,114,820 B1 * | 10/2006 | Parikka et al. ............... 362/602 |
| 2002/0163790 A1 | 11/2002 | Yamashita et al. |
| 2004/0022049 A1 | 2/2004 | Chang et al. |
| 2004/0075994 A1 | 4/2004 | Kuo |
| 2004/0130879 A1 * | 7/2004 | Choi et al. ..................... 362/31 |
| 2004/0246697 A1 | 12/2004 | Yamashita et al. |
| 2006/0044834 A1 | 3/2006 | Yu |

* cited by examiner

*Primary Examiner*—Thomas M Sember
(74) *Attorney, Agent, or Firm*—Sughrue Mion, PLLC

(57) ABSTRACT

A surface emitting device and a display apparatus including the same. The surface emitting device includes: a light source; and a light guide plate having a light exit surface on which holographic patterns are formed, and guiding light emitted by the light source such that the guided light is emitted from the light exit surface, wherein the holographic patterns are arranged so that light incident on the light guide plate without passing through any side surface of the light guide plate can be incident on the holographic patterns at an azimuth greater than 45° at which light emitting efficiency is low and light incident on the light guide plate and reflected by any side surface of the light guide plate can be incident on the holographic patterns at an azimuth at which light emitting efficiency is high.

14 Claims, 10 Drawing Sheets

SURFACE EMITTING DEVICE AND DISPLAY APPARATUS INCLUDING THE SAME

CROSS-REFERENCE TO RELATED PATENT APPLICATION

This application claims priority from Korean Patent Application No. 10-2006-0103888, filed on Oct. 25, 2006, in the Korean Intellectual Property Office, the disclosure of which is incorporated herein in its entirety by reference.

BACKGROUND OF THE INVENTION

1. Field of the Invention

The present invention relates to a surface emitting device that increases the amount of light perpendicularly emitted therefrom and thus has uniform distribution of light over an entire light exit surface.

2. Description of the Related Art

Surface emitting devices such as backlight units are used in liquid crystal displays (LCDs), which are non-emissive displays and thus use external light to produce an image.

Surface emitting devices are classified into direct light type devices and edge light type devices. Direct light type devices are configured such that a plurality of light sources disposed beneath an LCD panel directly emit light onto the LCD panel. Edge light type devices are configured such that a light source is located on a sidewall of a light guide plate (LGP). Since the light sources can be freely and effectively located over a wide area, the direct light type devices are generally used in relatively large displays. Since the light source is located on the sidewall of the LGP, the edge light type devices are generally used in relatively slim and small displays, such as small and medium-sized displays used for monitors or mobile phones.

Figure 1:
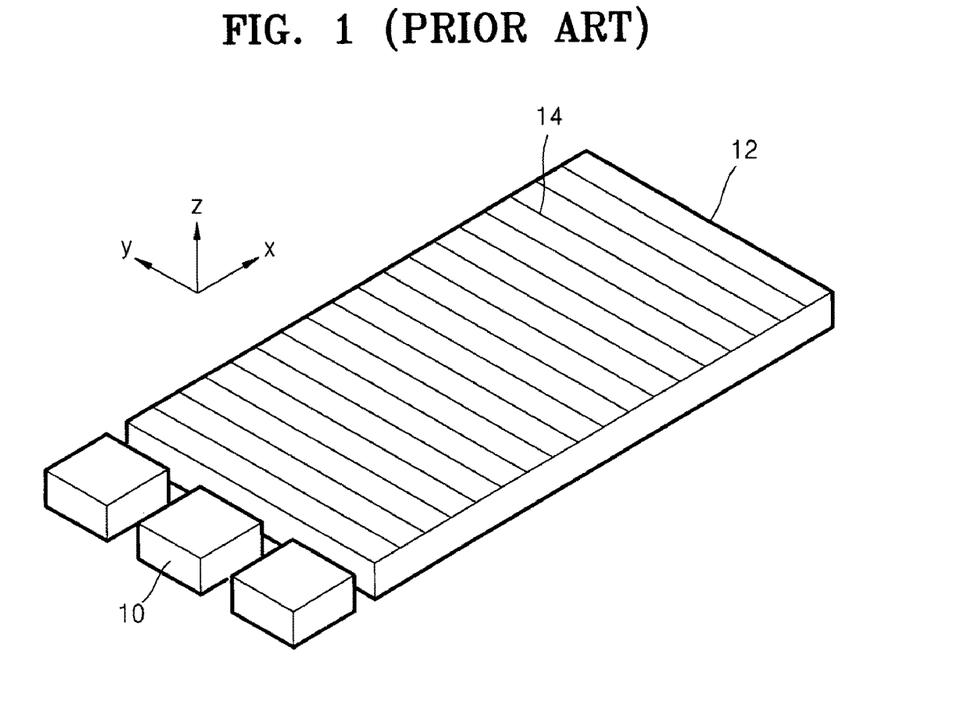
FIG. 1 is a perspective view of a conventional surface emitting device.

FIG. 1 is a perspective view of a conventional edge light type surface emitting device. Referring to FIG. 1, the conventional edge light type surface emitting device includes light sources 10 and an LGP 12. The LGP 12 has a side surface, acting as a light incident surface on which light emitted by the light source 10 is incident, and a top surface, acting as a light exit surface from which the incident light is emitted. The LGP 12 guides incident light thereon inside the LGP 12 by total reflection and emits the same through the top surface thereof. Holographic patterns 14 are formed on the top surface of the LGP 12. The holographic patterns 14 diffract light such that the light is emitted at an angle substantially perpendicular to the top surface, i.e., the light exit surface.

Light emitted by the conventional edge light type surface emitting device should have uniform brightness over the entire light exit surface, but there are some problems in obtaining such uniform brightness.

The uniformity of light exiting the LGP 12 on which the holographic patterns 14 are formed varies with the angle of light entering the holographic patterns 14. Accordingly, to achieve uniform brightness, the angle of light exiting the LGP 12 should be controlled properly.

Also, in the case of the conventional surface emitting device constructed as described above, the amount of light decreases at distances farther away from the light sources 10. Furthermore, hot spots are formed in a light incident portion near the light sources 10 and regions around the hot spots are darker.

Many attempts have been made to solve these problems by making less perceptible the holographic patterns 14 of the LGP 12 around the light incident portion, inserting a separate pattern to scatter light from the light incident portion toward side surfaces, or separately designing and manufacturing the light incident portion to increase the divergence angle of the light sources 10.

SUMMARY OF THE INVENTION

The present invention provides a surface emitting device that has uniform brightness over an entire surface.

According to an aspect of the present invention, there is provided a surface emitting device comprising: a light source; and a light guide plate having a light exit surface on which holographic patterns are formed, and guiding light emitted by the light source such that the guided light is emitted from the light exit surface, wherein the light guide plate comprises a plurality of side surfaces, wherein the holographic patterns are arranged so that light incident on the light guide plate without passing through one of the side surfaces of the light guide plate can be incident on the holographic patterns at an azimuth greater than 45° at which light emitting efficiency is low and light incident on the light guide plate and reflected by at least one of the side surfaces of the light guide plate can be incident on the holographic patterns at an azimuth at which light emitting efficiency is high.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS OF THE PRESENT INVENTION

Hereinafter, the present invention will be described more fully with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in, the art. In the drawings, lengths and sizes of layers and regions may be exaggerated for clarity.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. Like numbers refer to like elements throughout. As used herein, the term "and/or" includes any and all combinations of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the exemplary embodiments of the present invention.

Spatially relative terms, such as "below" or "lower" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" other elements or features would then be oriented "above" the other elements or features. Thus, the exemplary term "below" can encompass both orientations indicated by above and below. The device may be otherwise oriented (rotated 90 degrees or at other orientations) and the spatially relative descriptors used herein interpreted accordingly.

The terminology used herein is for the purpose of describing particular embodiments only and is not intended to limit the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, exemplary embodiments of the invention should not be construed as limited to the particular shapes of regions illustrated herein but, are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
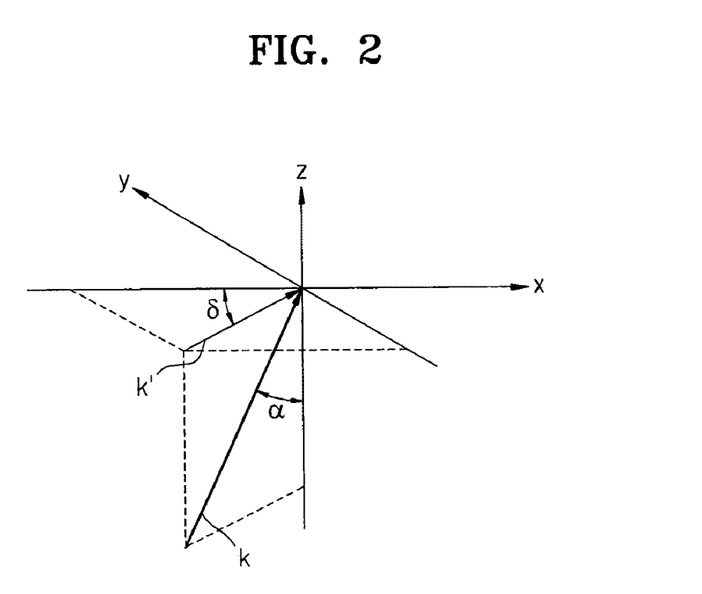
FIG. 2 is a coordinate system for explaining the altitude a and the azimuth δ of light incident on holographic patterns.

FIG. 2 is a coordinate system for explaining the altitude a and the azimuth $\delta$ of light incident on holographic patterns. The altitude a is the angle between the propagation vector k of light and a normal to a light exit surface, and the azimuth $\delta$ is the angle between a vector k' obtained by projecting the propagation vector k onto the light exit surface and the arrangement direction of the holographic patterns. In FIG. 2, when it is assumed that an x-y plane is a surface on which the holographic patterns are formed and the x-axis is the arrangement direction of the holographic patterns, the angle between the z-axis and the vector k is the altitude $\alpha$ and the angle between the vector k' and the x-axis is the azimuth $\delta$.

Figure 3:
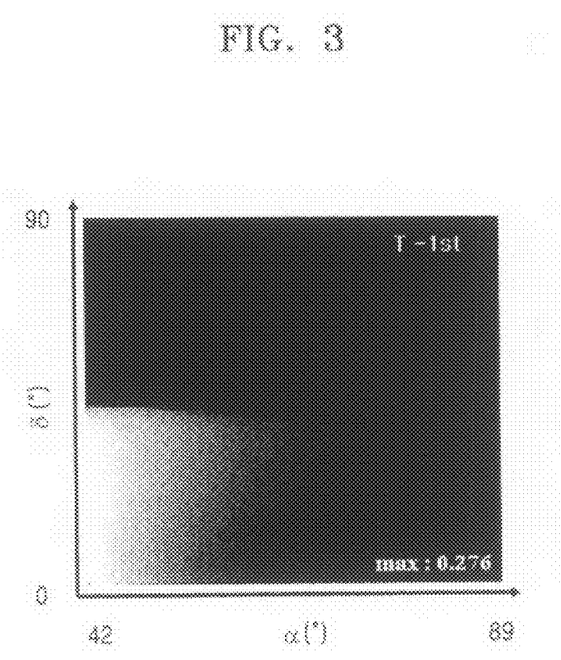
FIG. 3 is a graph illustrating the light emitting efficiency of a light guide plate (LGP), on which holographic patterns are formed, according to the altitude $\alpha$ and the azimuth $\delta$ of light incident on the holographic patterns.

FIG. 3 is a graph illustrating the light emitting efficiency of a light guide plate (LGP), on which holographic patterns are formed, according to the altitude a and the azimuth $\delta$ of light incident on the holographic patterns. Referring to FIG. 3, the azimuth $\delta$ primarily affects the amount of light emitted from the LGP, and the amount of light is sharply reduced when the azimuth $\delta$ is greater than about 45°. Accordingly, in the exemplary embodiment of the present invention, the amount of light emitted from the LGP is controlled by properly adjusting the azimuth $\delta$ of light incident on the holographic patterns.

Figure 4:
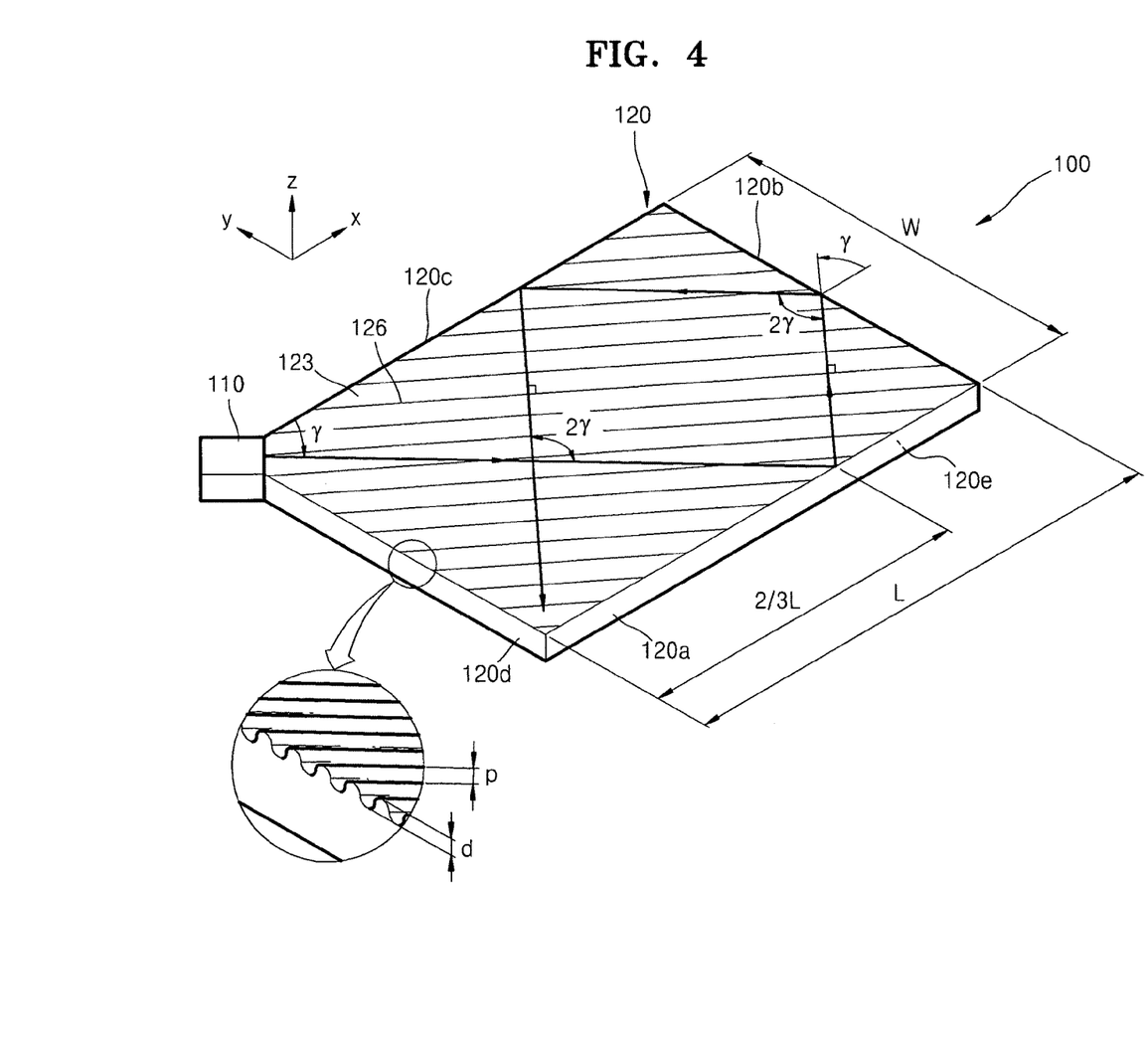
FIG. 4 is a perspective view of a surface emitting device according to an exemplary embodiment of the present invention.

FIG. 4 is a perspective view of a surface emitting device 100 according to an exemplary embodiment of the present invention.

Referring to FIG. 4, the surface emitting device 100 includes a light source 110 and an LGP 120. The LGP 120 has a top surface on which holographic patterns 126 are formed.

The light source 110 may be a light emitting diode (LED). The LGP 120 guides light emitted by the light source 110 such that the light propagates inside the LGP 120 and then is emitted from the top surface of the LGP 120. The top surface of the LGP 120 is a light exit surface 123. The LGP 120 is made of a transparent material such as polymethyl methacrylate (PMMA) or poly carbonate (PC). Since the LGP 120 propagates incident light therein inside the LGP 120 by total reflection and emits the same through the top surface thereof, light should be incident on the LGP 120 at an angle greater than a critical angle to be totally reflected at a bottom surface 120e and side surfaces 120a through 120d of the LGP 120. Alternatively, to this end, the bottom surface 120e and the side surfaces 120a through 120d may be processed to serve as mirror surfaces, or reflecting members (not shown) may be disposed on the bottom surface 120e and the side surfaces 120a through 120d.

The LGP 120 includes the holographic patterns 126. Although the holographic patterns 126 are formed on the light exit surface 123, i.e., the top surface of the LGP 120, this is just exemplary and the holographic patterns 126 may be formed on the bottom surface 120e or on both the light exit surface 123 and the bottom surface 120e. The holographic patterns 126 are constructed such that diffraction gratings with the depth d are arranged in a direction at predetermined pitches p. The depth d and pitch p of the holographic patterns 126 may be the same or different for each position of the light exit surface 123.

The arrangement direction of the holographic patterns 126 according to the present exemplary embodiment is determined considering the main direction of light propagating through the LGP 120. That is, the direction of light emitted from the light source 110 and the arrangement direction of the holographic patterns 126 are determined so that light emitted by the light source 110 and incident on the LGP 120 can initially reach the holographic patterns 126 at an azimuth at which light emitting efficiency is low, while light emitted from the light source 110, incident on the LGP 120, and reflected by any one of the side surfaces 120a through 120d of the LGP 120 can reach the holographic patterns 126 at an azimuth at which light emitting efficiency is high. For example, with reference to FIG. 3, the holographic patterns 126 and the light source 110 may be arranged so that light can initially reach the holographic patterns 126 at an azimuth greater than approximately 45° and light reflected by any side surface of the LGP 120 can reach the holographic patterns 126 at an azimuth much less than 45°, for example, close to 0°.

The arrangement of the light source 110 and the holographic patterns 126 will now be explained in detail.

The light source 110 emits light to any one of the side surfaces 120a through 120d of the LGP 120 so that the light can be incident on the holographic patterns 126 at a changed azimuth after being reflected by the any one of the side surfaces 120a through 120d of the LGP 120. For example, the light source 110 is disposed at a predetermined angle with respect to the horizontal axis of the LGP 120 and emits light to the side surface 120a. In FIG. 4, the horizontal axis of the LGP 120 is the x-axis, and the light source 110 is disposed to emit light in a direction that forms an angle γ with the x-axis.

The arrangement direction of the holographic patterns 126 is determined so that the light reflected by the side surface 120a can be incident on the holographic patterns 126 at an azimuth of approximately 0°. Here, the arrangement direction of the holographic patterns 126 is perpendicular to the longitudinal direction of each of the holographic patterns 126, and the same with the propagation direction of the light after being reflected by the side surface 120a. In other words, the light reflected by the side surface 120a propagates in a direction that forms an angle −γ with the x-axis, and the arrangement direction of the holographic patterns 126 also forms an angle −γ with the x-axis.

The light source 110 may be disposed on an edge of the LGP 120 as shown in FIG. 4. In this case, in order for light emitted by the light source 110 to travel toward the other edge after being reflected by the respective side surfaces 120a, 120b, and 120c of the LGP 120, the angle γ may be defined by $$\gamma = \tan^{-1}\left(\frac{3W}{2L}\right) \quad (1)$$

where L denotes the horizontal length of the LGP 120, and W denotes the vertical length of the LGP 120.

The surface emitting device 100 constructed as described above emits light with uniform brightness over the entire light exit surface 123 as follows. Light is emitted from the light source 110 to the side surface 120a of the LGP 120. Before reaching the side surface 120a of the LGP 120, the light may be incident on the bottom surface 120e or the light exit surface 123. Light incident on the bottom surface 120e of the LGP 120 is totally reflected, whereas light incident on the light exit surface 123 is emitted or reflected according to its azimuth with respect to the holographic patterns 126 as described with reference to FIG. 3. Light emitted by the light source 110 forms an angle γ with the horizontal axis (x-axis) of the LGP 120, and thus is incident on the holographic patterns 126 at an azimuth 2γ with respect to the arrangement direction of the holographic patterns 126. The azimuth 2γ may be greater than approximately 45° at which light emitting efficiency is low, and accordingly, the light incident on the holographic patterns 126 at the azimuth 2γ is reflected and is not emitted upward. The light reaching the side surface 120a of the LGP 120 is totally reflected to another side surface 120b.

At this time, the light emitted from the light exit surface 123 propagates at an angle −γ with respect to the horizontal axis (x-axis) of the LGP 120. Since the arrangement direction of the holographic patterns 126 forms an angle −γ with respect to the x-axis, the azimuth of light incident on the holographic patterns 126 becomes 0°, thereby resulting in high light emitting efficiency. Also, light reflected by the side surface 120b to the side surface 120c without reaching the holographic patterns 126 is incident on the holographic patterns 126 at an azimuth 2γ. Since the azimuth 2γ is greater than approximately 45°, the light is not emitted but reflected. When the light is reflected by the side surface 120c, the light is emitted because of having a direction −γ with respect to the x-axis and an azimuth of 0° with respect to the holographic patterns 126. As a result, since most of light at a position near to the light source 110 is incident on the holographic patterns 126 at a high azimuth with respect to the holographic patterns 126 without being reflected by any side surface, light emitting efficiency is low, thereby reducing the risk of hot spots appearing near the light source 110.

Figure 5:
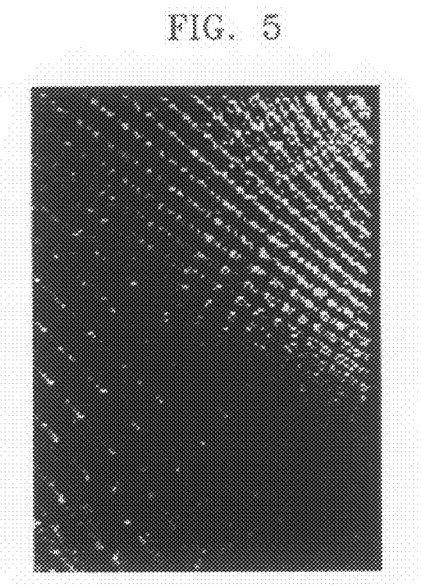
FIG. 5 is a simulation result illustrating light distribution on a light exit surface when the depths of holographic patterns of the surface emitting device of FIG. 4 are constant.

FIG. 5 is a simulation result illustrating light distribution on the light exit surface 123 when the holographic patterns 126 of the surface emitting device 100 of FIG. 4 have the same depth d. Referring to FIG. 5, since light at a point near to the light source 110 is incident on the holographic patterns 126 at a high azimuth, light emitting efficiency is low, formation of hot spots is greatly reduced at a light incident portion, and a brighter portion is formed in an area where a lot of light reflected by a side surface and incident on the holographic patterns 126 exists. To achieve more uniform brightness, the depth d of the holographic patterns 126 may be controlled.

Figure 6:
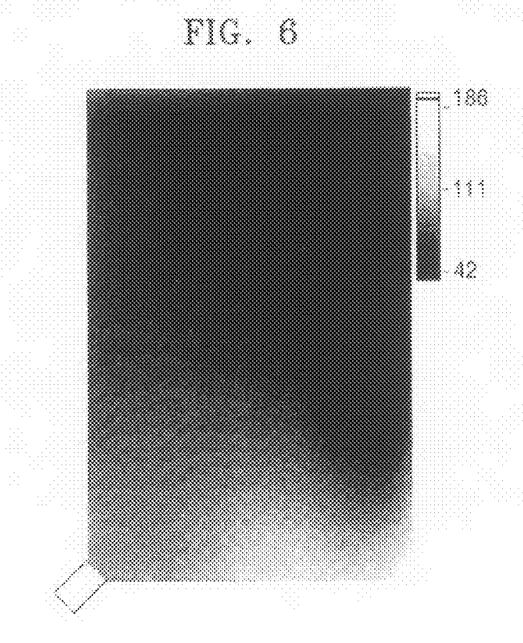
FIG. 6 illustrates the depth distribution of the holographic patterns of the surface emitting device of FIG. 4.

FIG. 6 is a diagram illustrating the depth distribution of the holographic patterns 126 of the surface emitting device 100 of FIG. 4. Referring to FIG. 6, the holographic patterns 126 have greater depths at a comparatively darker portion in consideration of the light distribution of FIG. 5.

Figure 7A:
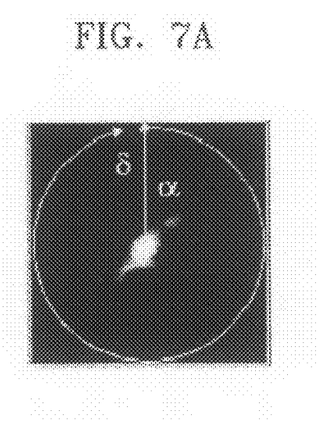
FIGS. 7A and 7B are simulation results illustrating light distribution on the light exit surface when the holographic patterns of the surface emitting device of FIG. 4 have the depth distribution of FIG. 6.
Figure 7B:
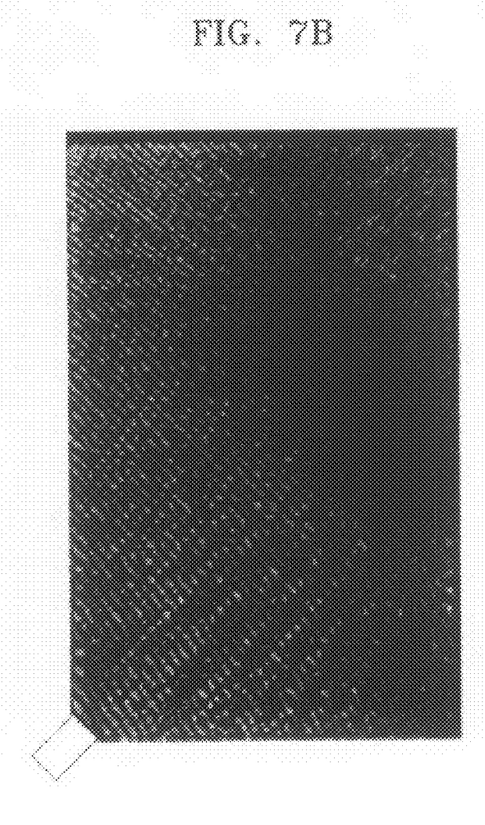

FIGS. 7A and 7B are simulation results illustrating light distribution on the light exit surface 123 when the holographic patterns 126 of the surface emitting device 100 of FIG. 4 have the depth distribution of FIG. 6. FIG. 7A illustrates light distribution according to the angle of light emitted from the light exit surface 123. Most of the emitted light is distributed around an altitude α of 0°. FIG. 7B illustrates light distribution on the light exit surface 123. Referring to FIG. 7B, uniform brightness is achieved over the entire light exit surface 123.

Figure 8:
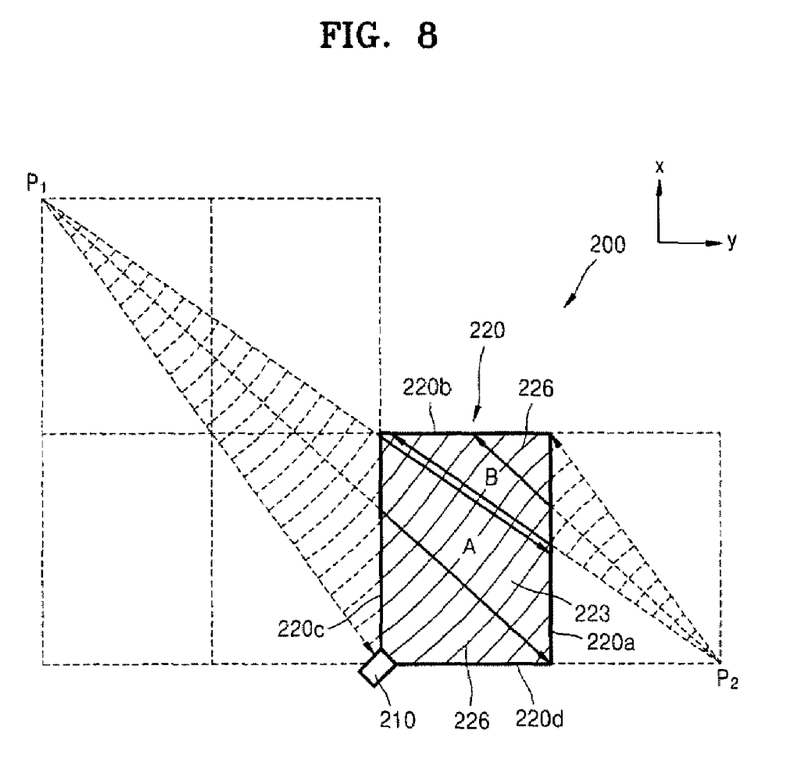
FIG. 8 is a plan view of a surface emitting device according to another exemplary embodiment of the present invention.

FIG. 8 is a plan view of a surface emitting device 200 according to another exemplary embodiment of the present invention. Referring to FIG. 8, the surface emitting device 200 includes a light source 210, and an LGP 220 having a top surface on which holographic patterns 226 are formed. Side surfaces 220a through 220d and a bottom surface (not shown) of the LGP 220 may be processed to serve as mirror surfaces, or reflecting members (not shown) may be disposed on the side surfaces 220a through 220d and the bottom surface.

The surface emitting device 200 of FIG. 8 is identical to the surface emitting device 100 of FIG. 4 except for the arrangement of the light source 210 and the holographic patterns 226. That is, the two surface emitting devices 100 and 200 of FIGS. 4 and 8 are identical to each other in that the light source 210 and the LGP 220 are arranged so that light emitted by the light source 210 and incident on the LGP 220, can initially reach the holographic patterns 226 at an azimuth at which light emitting efficiency is low and light emitted by the light source 210, incident on the LGP 220, and reflected by any side surface of the LGP 220 can reach the holographic patterns 226 at an azimuth at which light emitting efficiency is high. However, to accomplish the same purpose, the light source 210 and the holographic patterns 226 of the surface emitting device 200 are arranged in a different way from that of the surface emitting device 100.

Light is generally radiated from the light source 210 at a divergence angle. That is, the direction of light passing through each position of the LGP 220 is not fixed to one direction. Accordingly, the surface emitting device 220 operates according to the direction of light propagating through the LGP 220 and differentiates the arrangement direction of the holographic patterns 226 by each position of a light exit surface 223. For example, the LGP 220 may be divided into a region B from which light initially incident and reflected by the side surface 220a is mostly emitted and a region A from which light respectively reflected by the side surfaces 220a, 220b, and 220c is mostly emitted. In this case, the lights at the regions A and B propagate in the same paths as those when light sources are disposed on points $P_1$ and $P_2$.

Accordingly, the arrangement direction of the holographic patterns 226 at the region A is equal to the propagation direction of light radiated from the point $P_1$ toward the side surface 220c of the LGP 220, and the arrangement direction of the holographic, patterns 226 at the region B is equal to the propagation direction of light radiated from the point $P_2$ toward the side surface 220b. By adjusting the arrangement direction of the holographic patterns 226 considering the direction of light propagating through the LGP 220 at each position of the LGP 220, more uniform brightness can be achieved on all the positions.

Figure 9:
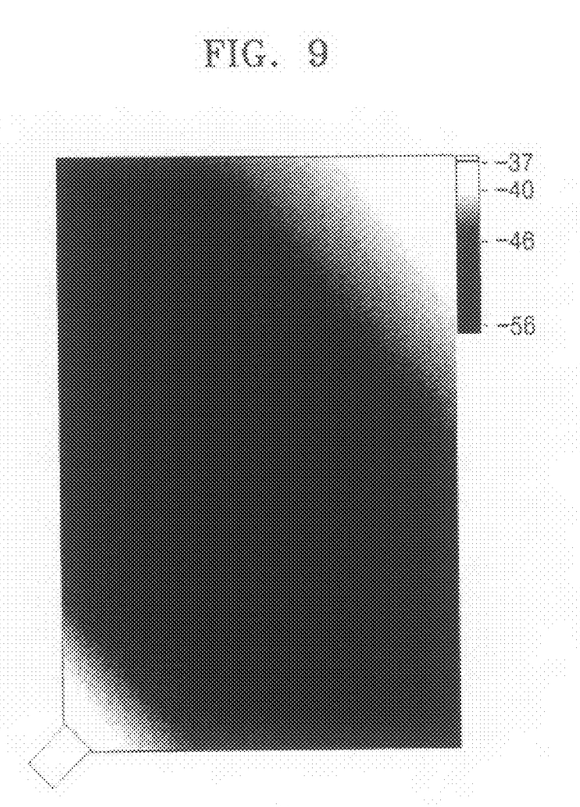
FIG. 9 is a diagram illustrating the arrangement direction distribution of holographic patterns of the surface emitting device of FIG. 8.

FIG. 9 is a diagram illustrating the arrangement direction distribution of the holographic patterns 226 of the surface emitting device 200 of FIG. 8. Here, the arrangement direction of the holographic patterns 226 is represented as an angle with respect to the x-axis.

Figure 10A:
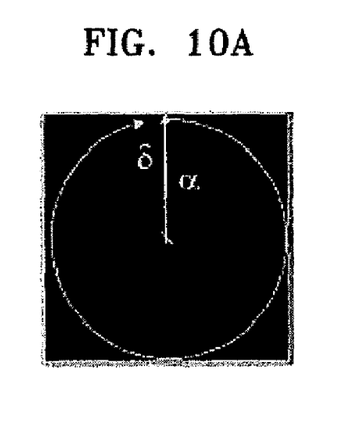
FIGS. 10A and 10B are simulation results illustrating light distribution on a light exit surface when the holographic patterns of the surface emitting device of FIG. 8 have the depth distribution of FIG. 6.
Figure 10B:
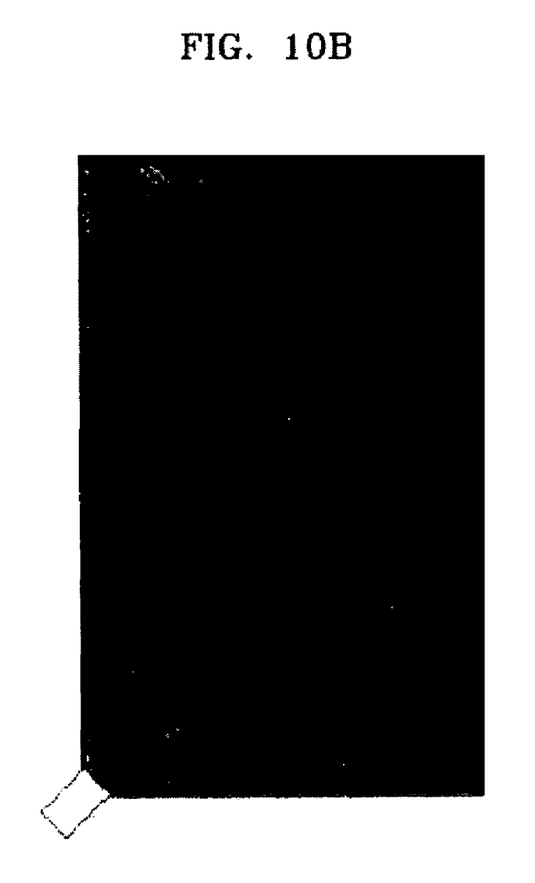

FIGS. 10A and 10B are simulation results illustrating light distribution on the light exit surface 223 when the holographic patterns 226 of the surface emitting device 200 of FIG. 8 have the depth distribution of FIG. 6. FIG. 10A illustrates light distribution according to the angle of light emitted from the light exit surface 223. Most of the emitted light is distributed around an altitude α of 0°. FIG. 10B illustrates light distribution on the light exit surface 223. Referring to FIG. 10B, uniform brightness is achieved over the entire light exit surface 223. Since the surface emitting device of FIG. 8 according to the present exemplary embodiment differentiates the arrangement direction of the holographic patterns 226 by each position of the light exit surface 223 considering the fact that light is radiated, the amount of light perpendicularly emitted from the light exit surface 223 is greater than that in the case of FIG. 7A.

Figure 11:
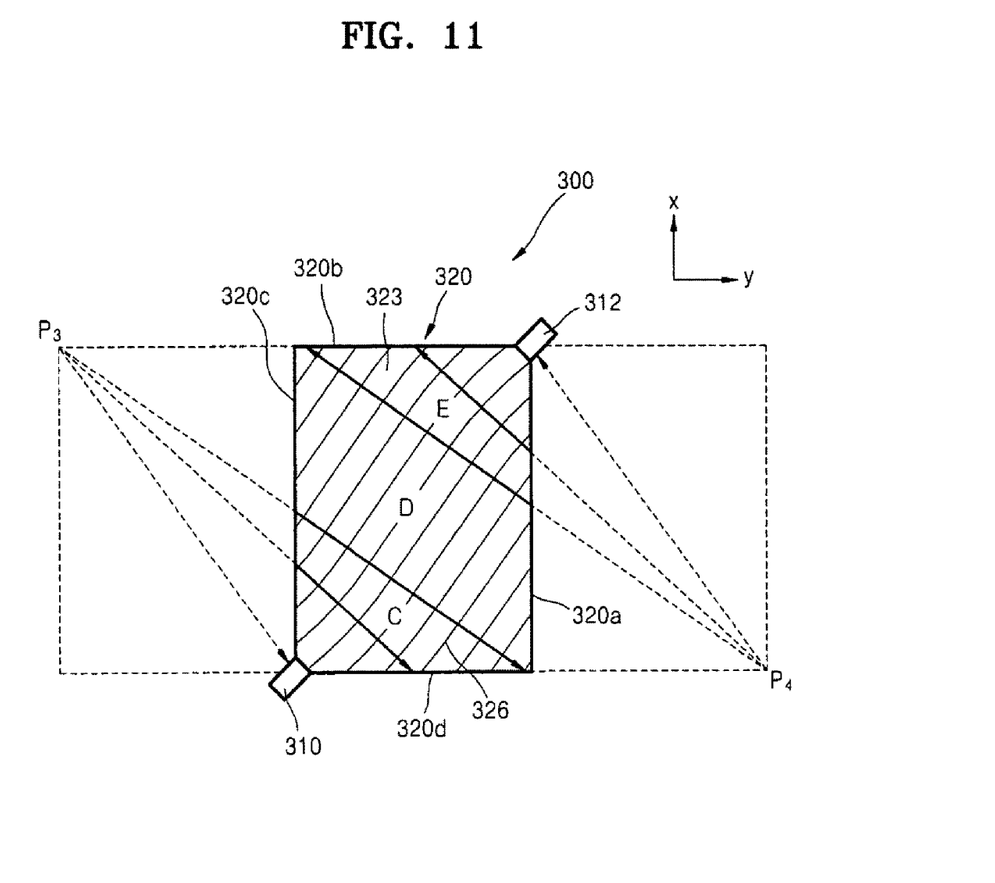
FIG. 11 is a plan view of a surface emitting device according to another exemplary embodiment of the present invention.

FIG. 11 is a plan view of a surface emitting device 300 according to another exemplary embodiment of the present invention. Referring to FIG. 11, the surface emitting device 300 includes first and second light sources 310 and 312, and an LGP 320 having a top surface on which holographic patterns 326 are formed. Side surfaces 320a through 320d and a bottom surface (not shown) of the LGP 320 may be processed to serve as mirror surfaces, or reflecting members (not shown) may be disposed on the side surfaces 320a through 320d and the bottom surface.

The surface emitting device 300 of FIG. 11 is identical to the surface emitting devices 100 and 200 of FIGS. 4 and 8 except for the arrangement of the first and second light sources 310 and 312 and the holographic patterns 326. That is, the three surface emitting devices 100, 200, and 300 of FIGS. 4, 8, and 11 are identical to one another in that the light sources 310 and 312 and the LGP 320 are arranged so that light emitted by the first and second light sources 310 and 312 and incident on the LGP 320 can initially reach the holographic patterns 326 at an azimuth at which light emitting efficiency is low and light emitted by the first and second light sources 310 and 312, incident on the LGP 320, and reflected by any side surface of the LGP 320 can reach the holographic patterns 326 at an azimuth at which light emitting efficiency is high. However, to accomplish the same purpose, the first and second light sources 310 and 312 and the holographic patterns 326 of the surface emitting device 300 are arranged in a different way from those of the surface emitting devices 100 and 200.

Referring to FIG. 11, the first and second light sources 310 and 312 are disposed on two edges of the LGP 320 which diagonally face each other. In this case, the arrangement direction of the holographic patterns 326 is differentiated by each position of the light exit surface 323 considering the direction of light propagating through the LGP 320. For example, the LGP 320 may be divided into three regions C, D, and E. Light emitted by the light source 312 and reflected by the side surface 320c is mostly emitted from the region C. That is, the light at the region C propagates in the same path as that when a light source is disposed on a point $P_3$ and emits light toward the side surface 320d.

Accordingly, the arrangement direction of the holographic patterns 326 at the region C is the same with the propagation direction of the light. Light emitted by the first light source 310 and reflected by the side surface 320a is mostly emitted from the region E. That is, the light propagates along the same path as in the case when a light source is disposed on a point $P_4$ and emits light toward the side surface 320b. Accordingly, the arrangement direction of the holographic patterns 326 at the region E is the same with the propagation direction of the light. Both light emitted by the first light source 310 and respectively reflected by the side surfaces 320a, 320b, and 320c and light emitted by the second light source 312 and respectively reflected by the side surfaces 320c, 320d, and 320a are emitted from the region D.

Accordingly, unlike at the C region and the E region, the holographic patterns 326 at the region D may be formed in a constant direction. For example, when the angle between the central axis of lights radiated from the first and second light sources 310 and 312 and the vertical axis (x-axis) of the LGP 320 is γ, the arrangement angle of the holographic patterns 326 is −γ.

The number and position of the light source of the surface emitting device are not limited to the above exemplary embodiments. The light source may be disposed on a position other than the edge. Three or more light sources may be disposed. In this case, the plurality of light sources may be parallel to one another or face each other as shown in FIG. 11. That is, any arrangement can be made if light emitted by the light source can be incident on the holographic patterns at a changed azimuth after being reflected by any side surface of the LGP, and particularly, the azimuth can be changed from a value at which light emitting efficiency is low to a value at which light emitting efficiency is high when light is emitted from the holographic patterns.

Although the holographic patterns are formed on the top surface, i.e., the light exit surface, of the LGP, the holographic patterns may be formed on the bottom surface of the LGP or on both the top and bottom surfaces of the LGP.

Figure 12:
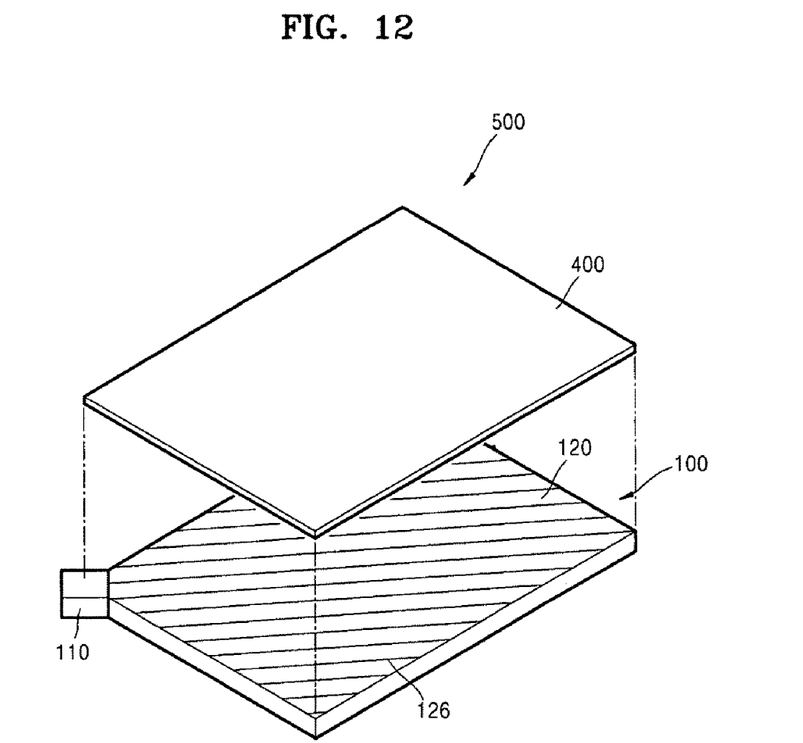
FIG. 12 is a perspective view of a display apparatus according to an exemplary embodiment of the present invention.

FIG. 12 is a perspective view of a display apparatus 500 according to an exemplary embodiment of the present invention. The display apparatus 500 includes the surface emitting device 100, and a display panel 400 that forms an image using light emitted by the surface emitting device 100. The display panel 400 may be a liquid crystal panel (LCP). The operation that the surface emitting device 100 including the light source 110 and the LGP 120 on which the holographic patterns 126 are formed emits light with uniform brightness over the entire light exit surface 123 is substantially the same as described above, and thus a detailed explanation thereof will not be given.

Although the surface emitting device 100 of FIG. 4 is used in the present exemplary embodiment, the surface emitting devices 200 and 300 of FIGS. 8 and 11 may also be used. Since the display apparatus 500 according to the present exemplary embodiment employs the surface emitting device 100 that increases the amount of light perpendicularly emitted therefrom and has uniform light distribution, brightness and image quality can be improved.

As described above, the surface emitting device according to the exemplary embodiments of the present invention include the holographic patterns, and the holographic patterns are formed so that light incident on the LGP can initially reach the holographic patterns at an azimuth at which light emitting efficiency is low and light incident on the LGP and reflected by any side surface of the LGP can reach the holographic patterns at an azimuth at which light emitting efficiency is high. Hence, hot spots are rarely produced near the light source, most of the emitted light is distributed around an altitude of about 0°, and brightness distribution is uniform. Accordingly, when the surface emitting device is used in a display apparatus, the display apparatus has high image quality.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A surface emitting device comprising:
a first light source; and
a light guide plate having a light exit surface on which holographic patterns are formed, and guiding light emitted by the first light source such that the guided light is emitted from the light exit surface,
wherein the light guide plate comprises a plurality of side surfaces;
wherein the holographic patterns and the first light source are arranged so that light incident on the light guide plate and not reflected by a side surface of the light guide plate is incident on the holographic patterns at an azimuth at which light emitting efficiency is low and light incident on the light guide plate and reflected by at least one of the side surfaces of the light guide plate is incident on the holographic patterns at an azimuth at which light emitting efficiency is high.

2. The surface emitting device of claim 1, wherein the light incident on the light guide plate and not reflected by a side surface of the light guide is incident on the holographic patterns at an azimuth greater than 45°.

3. The surface emitting device of claim 1, wherein the light incident on the light guide plate and reflected by at least one of the side surfaces of the light guide plate is incident on the holographic patterns at an azimuth ranging from 0 to 45°.

4. The surface emitting device of claim 1, wherein the light incident on the light guide plate and reflected by at least one of the side surfaces of the light guide plate is incident on the holographic patterns at an azimuth of 0°.

5. The surface emitting device of claim 1, wherein, on the light exit surface, when the angle between the central axis of light emitted by the light source and a first axis of the light guide plate is +θ, the angle between the arrangement direction of the holographic patterns and the first axis of the light guide plate is −θ.

6. The surface emitting device of claim 1, wherein said side surfaces of the light guide plate comprise one of mirror surfaces and reflecting members.

7. The surface emitting device of claim 6, wherein the first light source is disposed on a first edge of the light guide plate.

8. The surface emitting device of claim 7, wherein the first light source and a second light source are disposed on the first edge and a second edge of the light guide plate, respectively, and
wherein the first light source and the second light source diagonally face each other.

9. The surface emitting device of claim 7, wherein, when the light exit surface of the light guide plate is a rectangle with a size L×W, on the light exit surface, the angle γ between the central axis of light emitted by the light source and the L-axis of the light guide plate is defined by $$\gamma = \tan^{-1}\left(\frac{3W}{2L}\right).$$

10. A display apparatus comprising:
a surface emitting device comprising:
a first light source;
a light guide plate having a light exit surface on which holographic patterns are formed, and guiding light emitted by the first light source such that the guided light is emitted from the light exit surface,
wherein the light guide plate comprises a plurality of side surfaces;

wherein the holographic patterns and the first light source are arranged so that light incident on the light guide plate and not reflected by a side surface of the light guide plate is incident on the holographic patterns at an azimuth at which light emitting efficiency is low, and light incident on the light guide plate and reflected by at least one of the side surfaces of the light guide plate is incident on the holographic patterns at an azimuth at which light emitting efficiency is high; and a display panel forming an image using light emitted by the surface emitting device.

11. The display apparatus of claim 10, wherein said side surfaces of the light guide plate comprise one of mirror surfaces and reflecting members.

12. The display apparatus of claim 10, wherein the first light source is disposed on a first edge of the light guide plate.

13. The display apparatus of claim 12, wherein the first light source and a second light source are disposed on the first edge and a second edge of the light guide plate, respectively, and wherein the first light source and the second light source diagonally face each other.

14. The display apparatus of claim 12, wherein, when the light exit surface of the light guide plate is a rectangle with a size L×W, on the light exit surface, the angle γ between the central axis of light emitted by the light source and the L-axis of the light guide plate is defined by $$\gamma = \tan^{-1}\left(\frac{3W}{2L}\right).$$

* * * * *